United States Patent
Rai et al.

(10) Patent No.: US 9,983,029 B2
(45) Date of Patent: May 29, 2018

(54) INTEGRATED OPTICAL ENCODER FOR TILT ABLE ROTATABLE SHAFT

(71) Applicant: Apple Inc., Cupertino, CA (US)

(72) Inventors: Anant Rai, San Jose, CA (US); Prashanth Holenarsipur, Fremont, CA (US); Alex M. Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 14/870,301

(22) Filed: Sep. 30, 2015

(65) Prior Publication Data

US 2017/0089736 A1    Mar. 30, 2017

(51) Int. Cl.
*G01D 5/347* (2006.01)

(52) U.S. Cl.
CPC ....... *G01D 5/3473* (2013.01); *G01D 5/34707* (2013.01)

(58) Field of Classification Search
CPC ............. G01D 5/3473; G01D 5/34738; G01D 5/34707; G01D 5/347
See application file for complete search history.

(56) References Cited

U.S. PATENT DOCUMENTS

| | | | | |
|---|---|---|---|---|
| 3,688,410 A | * | 9/1972 | Zeidler | G01D 5/34738 33/773 |
| 3,934,428 A | * | 1/1976 | Hedin | F16D 3/72 403/229 |
| 4,752,683 A | * | 6/1988 | McGuire | G01D 5/34738 250/231.14 |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2015/034960 A1 | 3/2015 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Que T Le
*Assistant Examiner* — Jennifer Bennett
(74) *Attorney, Agent, or Firm* — Morrison & Foerster LLP

(57) ABSTRACT

Examples of the disclosure enclose an optical target on an encoder and sensors inside a single integrated module, wherein the encoder and the sensors are coupled to the same rigid body to maintain optical alignment between the sensors and the optical target on the encoder. Further, the module itself may be hermetically sealed to protect the optical path (e.g., from a light source to the optical target to the sensors) from contamination due to outside dirt, debris, or light sources internal/external to the device that might further interfere with alignment and/or proper sensing. Because the integrated module results in smaller variations in the alignment between the optical target and the sensors, the dynamic range of the sensors may be reduced, resulting in less power consumption and, potentially, longer battery life for the device. The use of an integrated module can also enable relaxed manufacturing requirements for the optical sensor and/or the optical target.

15 Claims, 8 Drawing Sheets

(56) References Cited

U.S. PATENT DOCUMENTS

| | | | |
|---|---|---|---|
| 4,901,014 A | * | 2/1990 | Riegger .............. F16C 27/066 |
| | | | 248/638 |
| 5,483,261 A | | 1/1996 | Yasutake |
| 5,488,204 A | | 1/1996 | Mead et al. |
| 5,698,849 A | | 12/1997 | Figueria, Jr. |
| 5,825,352 A | | 10/1998 | Bisset et al. |
| 5,835,079 A | | 11/1998 | Shieh |
| 5,880,411 A | | 3/1999 | Gillespie et al. |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,564,168 B1 | * | 5/2003 | Hasser ................ G01D 5/34 |
| | | | 250/231.14 |
| 6,690,387 B2 | | 2/2004 | Zimmerman et al. |
| 7,015,894 B2 | | 3/2006 | Morohoshi |
| 7,098,892 B2 | * | 8/2006 | Bohn ................ G06F 3/0312 |
| | | | 345/163 |
| 7,184,064 B2 | | 2/2007 | Zimmerman et al. |
| 7,663,607 B2 | | 2/2010 | Hotelling et al. |
| 8,479,122 B2 | | 7/2013 | Hotelling et al. |
| 2006/0197753 A1 | | 9/2006 | Hotelling |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

U.S. Appl. No. 14/796,915, filed Jul. 10, 2015.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

INTEGRATED OPTICAL ENCODER FOR TILTABLE ROTATABLE SHAFT

FIELD OF THE DISCLOSURE

This relates generally to optical encoders for electronic devices.

BACKGROUND OF THE DISCLOSURE

Some devices, including mechanical, electronic, and computerized devices, may utilize various types of encoders for obtaining and collecting data about that device, or to enable certain features/user interactions. For example, an optical encoder may include an optical target. A light source may emit light incident on the optical target which then reflects the light onto a sensor. Using this information, the rotation of the encoder may be determined. However, optical alignment between the optical target and the sensor may be subject to large variations. As a result, the sensor may need to be capable of sensing in a relatively large dynamic range to account for those variations. Further, the variations may be exacerbated if the device is subject to environmental or mechanical shock/stress events, putting the optical target and the sensor out of optical alignment.

SUMMARY OF THE DISCLOSURE

In various electronic devices, rotational movement of a component (e.g., a crown in a watch or other wearable device) of the electronic device may need to be determined In such instances, an optical encoder coupled to the component may be used to detect the rotational movement of the component. For example, as the component is rotated by a user, a light source of the device can emit light incident on the optical encoder as the encoder rotates with the component. The encoder may include an optical target, such as a pattern of high-reflective and low-reflective regions in a particular sequence or in a particular pattern.

When the light from the light source is incident upon the optical target, the high-reflective and low-reflective regions of the optical target can reflect differing amounts of light onto one or more light sensors (e.g., photodiodes) associated with the optical encoder. The sensors can process the reflected light and a determination may be made as to the direction, speed, and rotational movement of the optical encoder.

In some examples, the accuracy of the optical encoder may be reliant upon optical alignment between the sensors and the optical target on the encoder. When there are large variations in the optical alignment, the sensors may need to be capable of sensing in a relatively large dynamic range to account for those variations.

Examples of the disclosure enclose the optical target and the sensors inside a single integrated module, wherein the encoder and the sensors are coupled to the same rigid body to maintain optical alignment between the sensors and the optical target on the encoder. Further, the module itself may be hermetically sealed to protect the optical path (e.g., from the light source to the optical target to the sensors) from contamination due to outside dirt, debris, or light sources internal/external to the device that might further interfere with alignment and/or proper sensing. Because the integrated module results in smaller variations in the alignment between the optical target and the sensors, the dynamic range of the sensors may be reduced, resulting in less power consumption and, potentially, longer battery life for the device. The use of an integrated module can also enable relaxed manufacturing requirements for the optical sensor and/or the optical target.

BRIEF DESCRIPTION OF THE DRAWINGS

For a better understanding of the various described examples, reference should be made to the Detailed Description below, in conjunction with the following drawings in which like reference numerals refer to corresponding parts throughout the figures.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the disclosed examples.

In various electronic devices, rotational movement of a component (e.g., a crown in a watch or other wearable device) of the electronic device may need to be determined In such instances, an optical encoder coupled to the component may be used to detect the rotational movement of the component. For example, as the component is rotated by a user, a light source of the device can emit light incident on the optical encoder as the encoder rotates with the component. The encoder may include an optical target, such as a pattern of high-reflective and low-reflective regions in a particular sequence or in a particular pattern.

When the light from the light source is incident upon the optical target, the high-reflective and low-reflective regions of the optical target can reflect differing amounts of light onto one or more light sensors (e.g., photodiodes) associated with the optical encoder. The sensors can process the reflected light and a determination may be made as to the direction, speed, and rotational movement of the optical encoder.

In some examples, the accuracy of the optical encoder may be reliant upon optical alignment between the sensors and the optical target on the encoder. When there are large variations in the optical alignment, the sensors may need to be capable of sensing in a relatively large dynamic range to account for those variations.

Examples of the disclosure enclose the optical target and the sensors inside a single integrated module, wherein the encoder and the sensors are coupled to the same rigid body to maintain optical alignment between the sensors and the optical target on the encoder. Further, the module itself may be hermetically sealed to protect the optical path (e.g., from the light source to the optical target to the sensors) from contamination due to outside dirt, debris, or light sources internal/external to the device that might further interfere with alignment and/or proper sensing. Because the integrated module results in smaller variations in the alignment between the optical target and the sensors, the dynamic range of the sensors may be reduced, resulting in less power consumption and, potentially, longer battery life for the device. The use of an integrated module can also enable relaxed manufacturing requirements for the optical sensor and/or the optical target.

Figure 1:
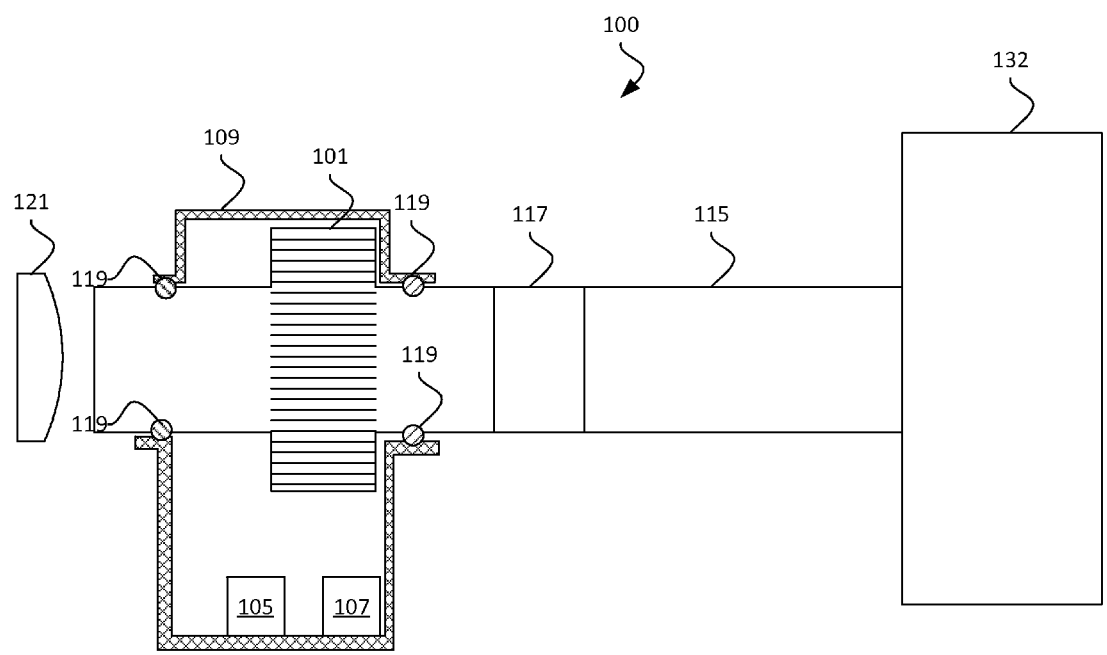
FIG. 1 illustrates an exemplary electronic device in accordance with examples of the disclosure.

FIG. 1 illustrates an electronic device 100 in accordance with examples of the disclosure. The electronic device 100 can include an optical encoder 101, a plurality of sensors 105, and a light source 107. The three optical elements (the optical target on the optical encoder 101, the plurality of sensors 105, and the light source 107) can each be coupled to and enclosed within a single rigid body, the integrated module 109. The electronic device 100 can further include a shaft 115 coupled to the encoder 101 via a coupler 117. The shaft 115 may be rotated when a user rotates a component (such as a crown, joystick, or similar element) 132 coupled to the end of the shaft. The shaft 115 may, in turn, cause the encoder 101 to rotate, and the electronic device 100 can detect rotation using the sensors 105.

In some examples, the encoder 101 may be coupled to the integrated module 109 via one or more O-rings 119. The O-rings 119 can both (1) seal (e.g., hermetically seal) the integrated module 109, and (2) tightly couple the encoder 101 to the integrated module such that the encoder can rotate freely but may be prevented from tilting with respect to the axis of rotation, which could disturb optical alignment.

In some examples, the electronic device 100 can further include a first button 121. The optical encoder 101 may be disposed to make contact with and depress the first button 121 when a user pushes on the component 132 in the direction of the button.

Figure 2:
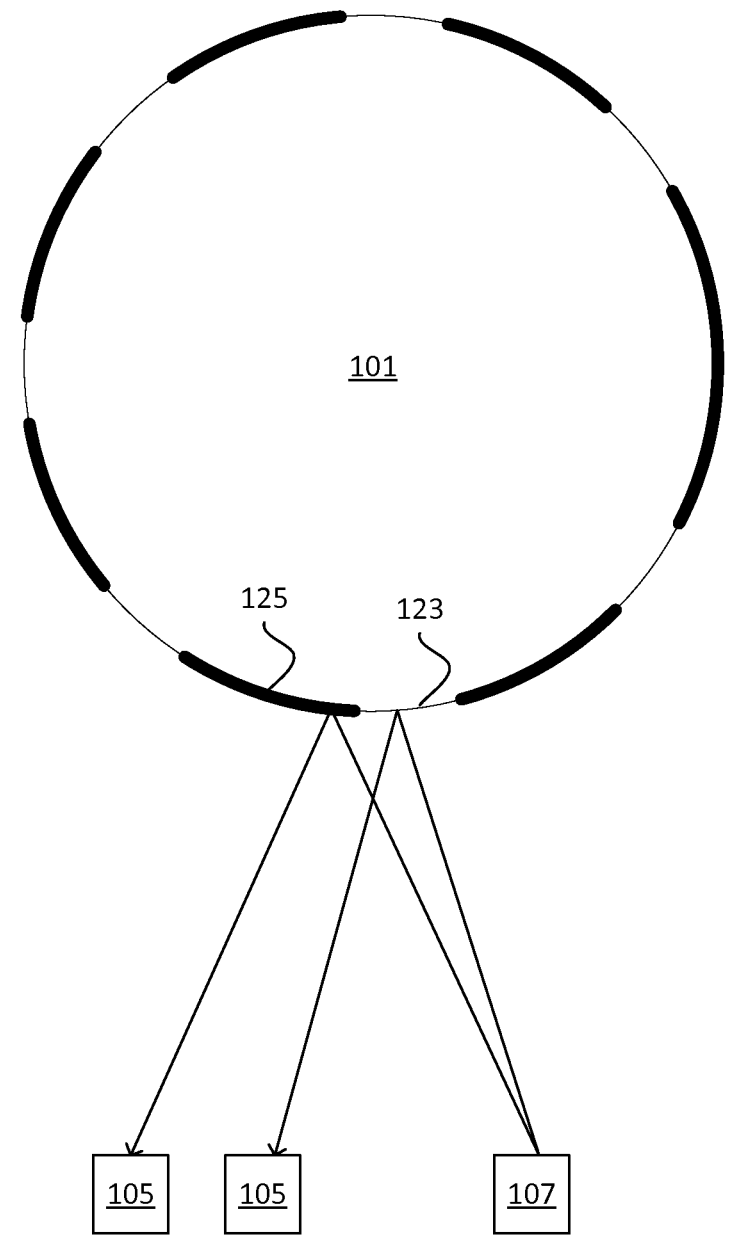
FIG. 2 illustrates a simplified example of sensing rotation of an optical encoder in accordance with examples of the disclosure.

FIG. 2 illustrates a simplified example of sensing rotation of an optical encoder in accordance with examples of the disclosure. In FIG. 2, light is emitted from a light source 107, reflects off the optical target on the optical encoder 101, and is detected by the plurality of sensors 105. Although only two sensors 105 are illustrated in FIG. 2, examples of the disclosure may use any number of sensors arranged in any number of configurations for detecting rotation of the optical encoder 101. The sensors 105 may include photodiodes, CMOS sensors, photovoltaic cells, photo resistive components, etc. Further, the light source 107 can be any type of emitter that provides light, such as a light-emitting diode (LED), laser diode, light bulb, etc. In some examples, more than one light source (and more than one kind of light source) may be included.

As illustrated in FIG. 2, the optical encoder 101 may include an optical target, such as a pattern of high-reflective regions 123 and low-reflective regions 125 in a particular sequence or in a particular pattern. The high-reflective regions 123 can be made of a material (e.g., a material adhered or embedded to the optical encoder 101, a coating applied to the optical encoder, the material of the optical encoder itself, etc.) that reflects more light than the material that makes up the low-reflective regions 125 (e.g., a material adhered or embedded to the optical encoder 101, a coating applied to the optical encoder, the material of the optical encoder itself, etc.). The pattern can be used to detect rotational movement of the optical encoder 101 as described below. In some examples, the pattern may include different colors, shades, etc. alternatively or in addition to a pattern of differing reflectiveness.

In FIG. 2, two different optical paths are illustrated from the light source 107 to the sensors 105. A first optical path may be incident on the high-reflective region 123 and reflected to one light sensor. A second optical path may be incident on the low-reflective region 125 and reflected to the other light sensor. Accordingly, in the configuration illustrated in FIG. 2, one light sensor can detect more light reflected by the optical encoder 101 than the other light sensor at the same time. Further, the light detected by each sensor 105 can vary as the optical encoder is rotated and the pattern of high-reflective regions 123 and low-reflective regions 125 move with respect to the optical paths from the light source 107 to each of the plurality of sensors 105. In addition, the light sensed by each sensor 105 can vary differently during rotation of the encoder 101. For example, during rotation, the light sensed by one sensor can increase while the light sensed by another sensor decreases due to the movement of the pattern of the optical target. Accordingly, rotation and rotation speed of the encoder 101 can be detected based on changes in the light sensed by the plurality of sensors 105, as described in U.S. patent application Ser. No. 14/796,915, "Dynamic Range Control for Optical Encoders," filed on Jul. 10, 2015, which is hereby incorporated by reference in its entirety.

When the optical encoder 101, the sensors 105, and the light source 107 remain in optical alignment, the optical paths can be maintained and any variations in light sensed by the sensors can be attributed to rotation of the encoder, allowing for proper detection and calculation of the encoder's rotation. In contrast, if the encoder 101 moves closer to or further from the sensors 105 and the light source 107, optical alignment may be disturbed. That is, the optical paths from the light source 107 to the sensors 105 may be altered, and variations in the sensed light may not be attributable to rotation of the encoder 101, potentially resulting in inaccurate or imprecise detection of rotation.

Figure 3C:
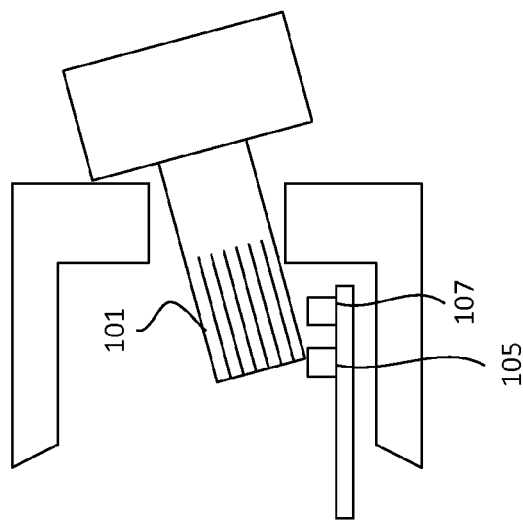
FIGS. 3A-3C illustrate an exemplary optical encoder moving out of optical alignment with sensors and a light source in accordance with examples of the disclosure.
Figure 3B:
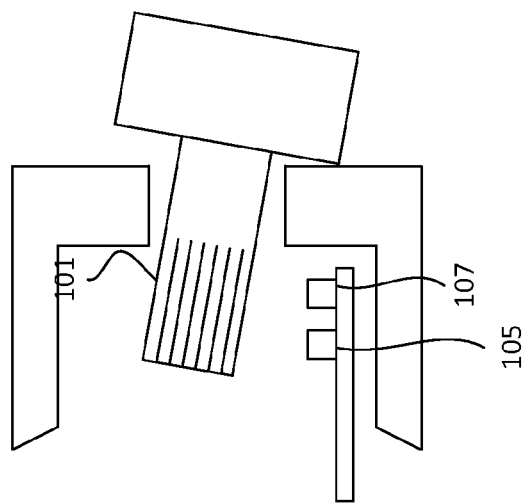
Figure 3A:
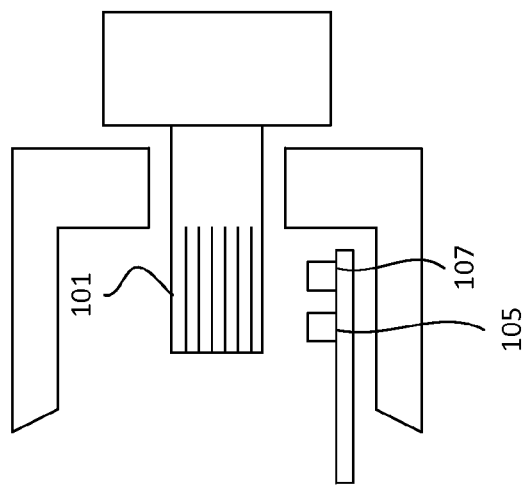

FIGS. 3A-3C illustrate an optical encoder 101 moving out of optical alignment with sensors 105 and light source 107 in accordance with examples of the disclosure. In FIGS. 3A-3C, the encoder 101, the sensors 105, and the light source 107 are not coupled to a body that maintains optical alignment. As the encoder 101 tilts with respect to its axis of rotation, FIG. 3B illustrates the encoder moving further from the sensors 105 and the light source 107, and FIG. 3C illustrates the encoder moving closer to the sensors and the light source.

In addition to improper sensing that may result from the optical alignment being disturbed, a device that does not maintain proper optical alignment (e.g., as illustrated in FIGS. 3A-3C) may need to be able to sense with a greater dynamic range than a device that better maintains optical alignment (e.g., as illustrated in FIG. 1). If the sensors 105 in the device illustrated in FIGS. 3A-3C sense light in a relatively limited dynamic range, then the sensors may become saturated when the optical encoder 101 moves close to the sensors in FIG. 3C, and the sensors may produce a signal with an unusably low signal-to-noise ratio when the optical encoder moves away from the sensors in FIG. 3B. In contrast, because optical alignment is better maintained by the device 100 illustrated in FIG. 1, it can operate at the same relatively limited dynamic range without suffering from saturation or a low signal-to-noise ratio.

Figure 4A:
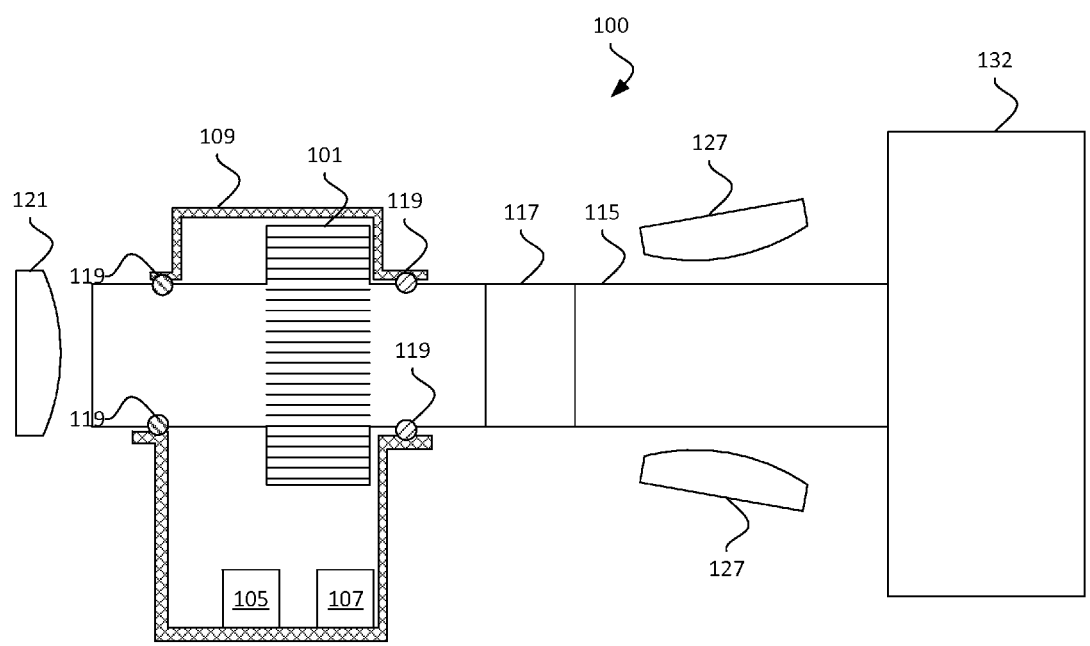
FIGS. 4A-4C illustrate an exemplary device with a flexible coupler between the optical encoder and the shaft in accordance with examples of the disclosure.
Figure 4B:
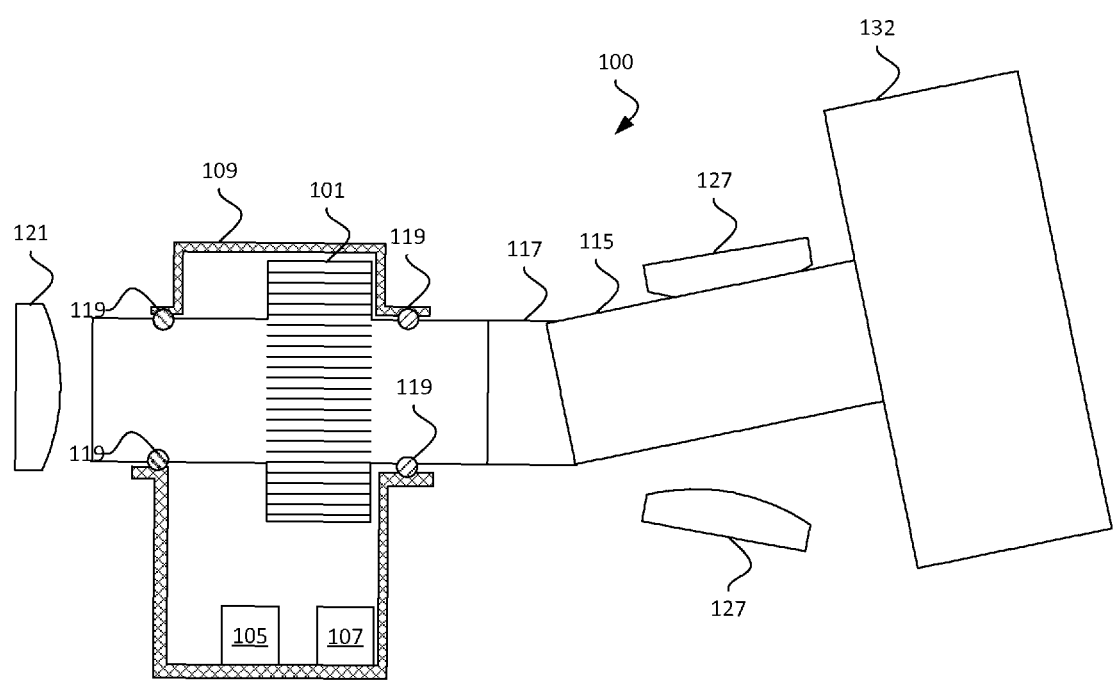
Figure 4C:
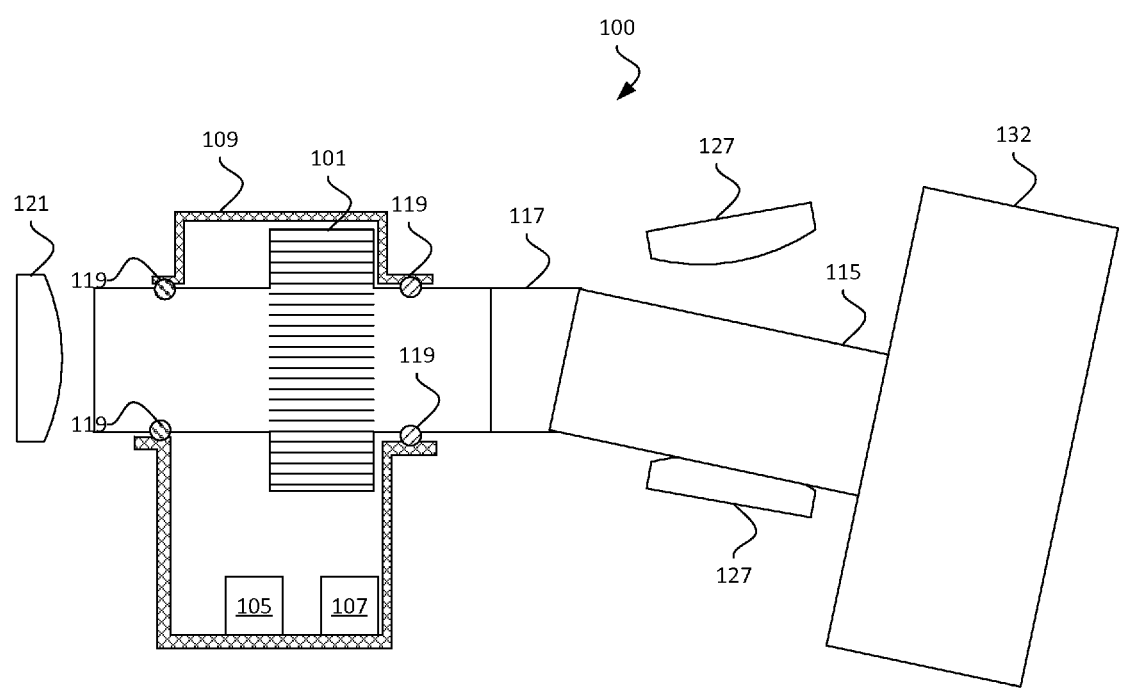

In some examples, optical alignment can be better maintained by coupling the optical encoder 101 to the shaft 115 using a coupler 117 that allows the shaft to tilt without tilting optical encoder 101. For example, FIGS. 4A-4C illustrate a device 100 with a flexible coupler 117 between the optical encoder 101 and the shaft 115 in accordance with examples of the disclosure. In FIG. 4B the shaft 115 tilts up and, in FIG. 4C the shaft tilts down. In both cases, the optical encoder 101 does not tilt, and optical alignment is maintained, because the coupler 117 is a flexible coupler.

In some examples, allowing the shaft 115 to tilt while maintaining optical alignment of the optical encoder 101 can have the added benefit of providing an additional mechanism of user input using the component 132. For example, one or more buttons 127 can be disposed around the shaft 115 such that the shaft may make contact with and depress one of the buttons when a user tilts the component 132 in the direction of the button. In FIG. 4B, the component 132 is tilted upward towards the upper button 127 and the shaft depresses the upper button. In FIG. 4C, the component 132 is tilted downward towards the lower button 127 and the shaft depresses the lower button. In each case, an input signal can be sent to the electronic device in accordance with the particular button that was depressed. In other examples, one or more mechanical switches can be employed that include a first portion that is fixed with respect to module 109 and a second portion that extends into an interior of the shaft 115, but does not make contact with the interior of the shaft when the crown is not tilted. When the component 132 is tilted, the second portion of the switch can make contact with the interior of the shaft to actuate the switch.

Although FIGS. 4A-4C illustrate a flexible coupler 117, examples of the disclosure are not so limited and may further include any kind of coupler, flexible or inflexible, such as a magnetic coupler, a gearing coupler, a helical beam coupler, a constant-velocity (CV) joint, a flex disc coupler, and/or a servo flex coupler, among other possibilities.

Figure 5:
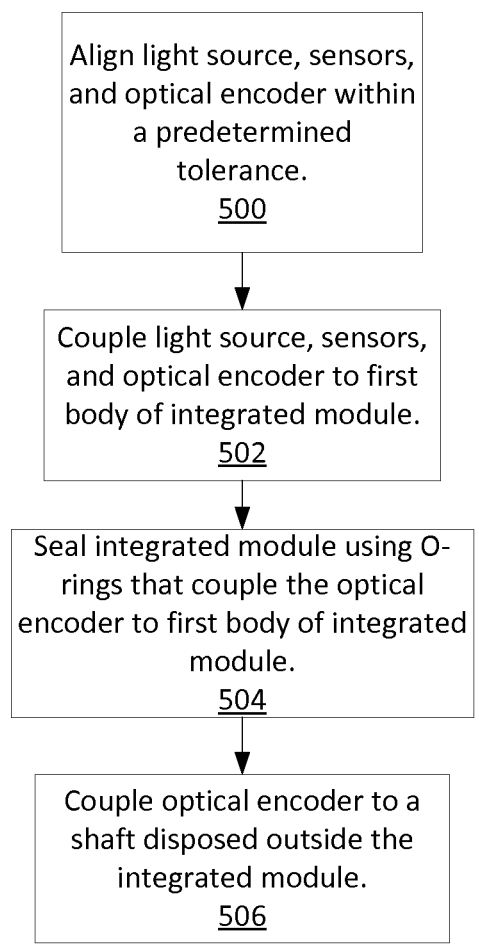
FIG. 5 is a flowchart illustrating an exemplary method of manufacturing electronic device in accordance with examples of the disclosure.

FIG. 5 is a flowchart illustrating an exemplary method of manufacturing electronic device 100 in accordance with examples of the disclosure. The light source 107, the plurality of sensors 105, and the optical encoder 101 may be aligned (500) within a predetermined tolerance. Further, the light source 107, the plurality of sensors 105, and the optical encoder 101 may be coupled (502) to a first body of an integrated module 109, and the integrated module may enclose the light source, the plurality of sensors, and at least a portion of the optical encoder (e.g., the optical target of the optical encoder). In some examples, the integrated module can further enclose circuitry of the plurality of sensors and/or the light source.

In some examples, coupling the optical encoder 101 and one of the plurality of sensors to the first body of the integrated module can maintain optical alignment of the optical encoder and the one of the plurality of sensors within the predetermined tolerance used during alignment. The alignment and coupling process can include measuring and testing to ensure the optical alignment falls within the predetermined tolerance.

In some examples, the optical encoder 101 can be considered in optical alignment with a sensor 105 if the distance between the optical encoder and the sensor is within 30% tolerance of an expected assembly distance (e.g., 3 mm, 5 mm, 10 mm, etc.) between the optical encoder and the sensor. In some examples, an optical encoder 101 can be considered in optical alignment with a sensor 105 if the distance between the optical encoder and the sensor is within a 20% tolerance of an expected assembly distance between the optical encoder and the sensor. Other tolerances for optical alignment are possible and contemplated in accordance with examples of the disclosure.

In some examples, an optical target comprising a pattern of high-reflective and low-reflective regions may be deposited on a surface of the optical encoder 101. Other approaches can include altering the surface mechanical properties to create high-reflective and low-reflective regions, for instance through machining, etching or other processes. In some examples, the low-reflective regions may be the material of the encoder 101 itself, and the high-reflective regions may be deposited on the surface of the encoder, and/or the high-reflective regions may be the material of the encoder 101 itself, and the low-reflective regions may be deposited on the surface of the encoder, among other possibilities.

The integrated module can be sealed (504) using one or more O-rings that couple the optical encoder to the first body of the integrated module. The O-rings can be configured to allow the optical encoder to rotate but prevent the optical encoder from tilting with respect to the axis of rotation. By ensuring optical alignment of the components within the integrated module 109 and then sealing the integrated module, optical alignment can be ensured independently of the assembly of the rest of the electronic device (e.g., before the optical encoder 101 is coupled to the shaft 115, and before the sensors 105 and light source 107 are electrically connected to the electronic device), thereby simplifying the testing and assembly process and allowing optical alignment to be more tightly controlled. Further, sealing (e.g., hermetically) the integrated module may prevent contamination of the optical components from outside dirt, debris, or light.

After aligning the components within the integrated module and sealing the integrated module, the optical encoder 101 can be coupled (506) to the shaft 115 (e.g., using a coupler 117), wherein the shaft may be disposed outside the integrated module. In some examples, the shaft is flexibly coupled to the optical encoder such that the shaft is able to tilt without causing the optical encoder to tilt and move out of optical alignment with the light source and the plurality of sensors. For example, the shaft may be coupled to the optical encoder using a flexible coupler such as a helical beam coupler. Further, one or more buttons may be disposed around or within the shaft and configured to be depressed by the shaft when the shaft is tilted, as illustrated in FIGS. 4A-4C.

In some examples, the plurality of sensors and the light source may be electrically connected to the electronic device through one or more components of the first body (e.g., vias or other electrical connectors that allow the sensors and the light source inside the integrated module to be connected to further circuitry of the electronic device disposed outside the sealed integrated module).

Figure 6:
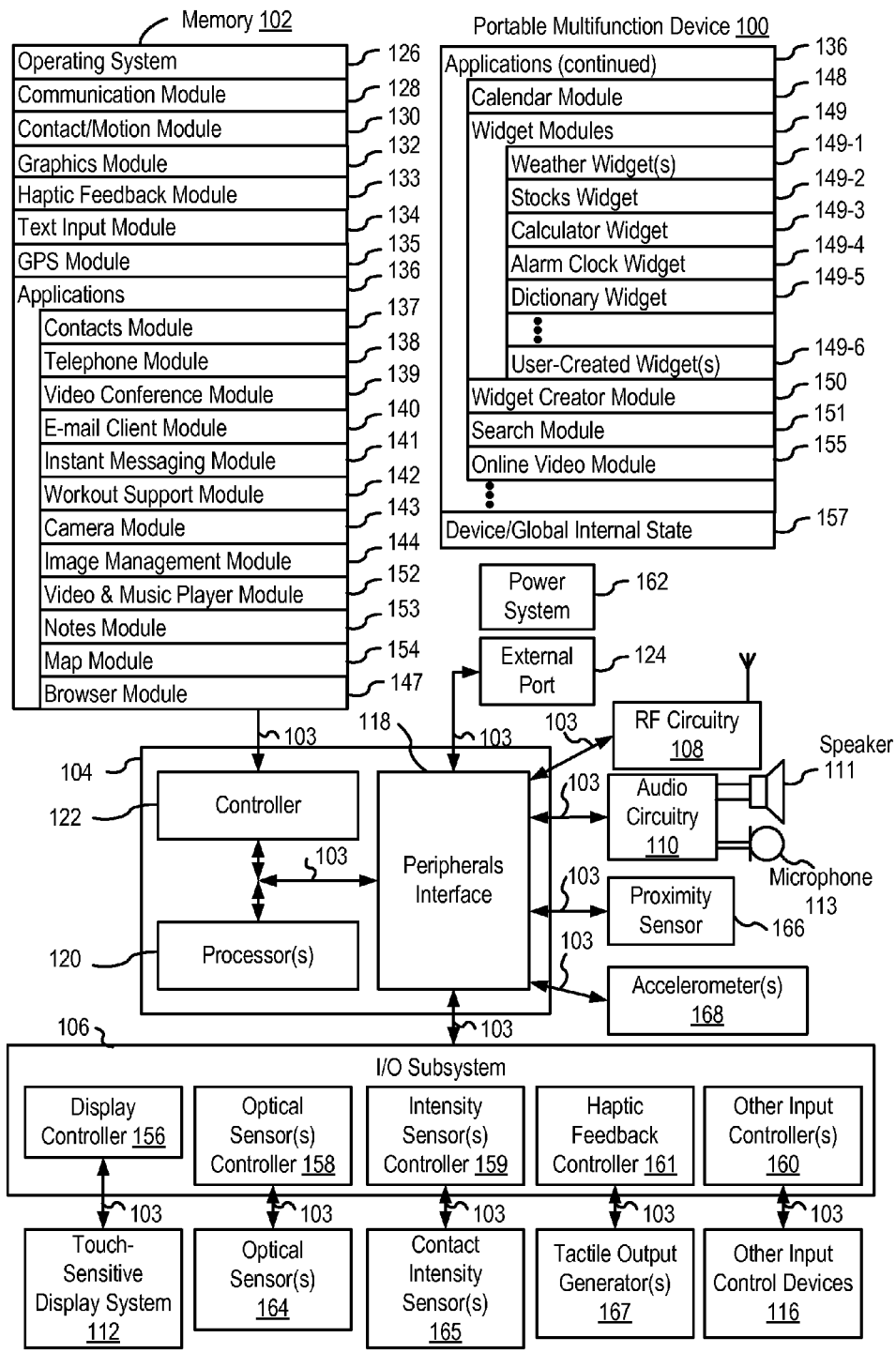
FIG. 6 is a block diagram illustrating a portable multifunction device with a touch-sensitive display in accordance with some examples.

Attention is now directed toward examples of portable devices with touch-sensitive displays that can include the example optical encoder modules disclosed herein. FIG. 6 is a block diagram illustrating portable multifunction device 100 with touch-sensitive display system 112 in accordance with some examples. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 6 are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some examples, peripherals interface 118, CPU 120, and memory controller 122 may be implemented on a single chip, such as chip 104. In some other examples, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some examples, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate examples, input controller(s) 160 are, optionally, coupled to any (or none) of the following: a keyboard, an infrared port, a USB port, and a pointer device such as a mouse. The one or more buttons optionally include an up/down button for volume control of speaker 111 and/or microphone 113. The one or more buttons optionally include a push button.

A quick press of the push button may disengage a lock of touch screen 112 or begin a process that uses gestures on the touch screen to unlock the device, as described in U.S. Patent Application Pub. No. 2007/0150842, "Unlocking a Device by Performing Gestures on an Unlock Image," published Jun. 28, 2007, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some examples, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In one example, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other examples. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In one example, projected mutual capacitance sensing technology is used, such as that found in the iPhone® and iPod Touch® from Apple Inc. of Cupertino, Calif.

A touch-sensitive display in some examples of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some examples of touch screen 112 may be as described in the following applications: (1) U.S. Patent Application Pub. No. 2007/0257890, "Multipoint Touch Surface Controller," published Nov. 8, 2007; (2) U.S. Patent Application Pub. No. 2006/0097991, "Multipoint Touchscreen," published May 11, 2006; (3) U.S. Patent Application Pub. No. 2006/0026521, "Gestures For Touch Sensitive Input Devices," published Feb. 2, 2006; (4) U.S. Patent Application Pub. No. 2006/0026536, "Gestures For Touch Sensitive Input Devices," published Feb. 2, 2006; (5) U.S. Patent Application Pub. No. 2006/0026535, "Mode-Based Graphical User Interfaces For Touch Sensitive Input Devices," published Feb. 2, 2006; (6) U.S. Patent Application Pub. No. 2006/0033724, "Virtual Input Device Placement On A Touch Screen User Interface," published Feb. 16, 2006; (7) U.S. Patent Application Pub. No. 2006/0053387, "Operation Of A Computer With A Touch Screen Interface,"

published Mar. 9, 2006; (8) U.S. Patent Application Pub. No. 2006/0085757, "Activating Virtual Keys Of A Touch-Screen Virtual Keyboard," published Apr. 20, 2006; and (9) U.S. Patent Application Pub. No. 2006/0197753, "Multi-Functional Hand-Held Device," published Sep. 7, 2006. All of these applications are incorporated by reference herein in their entirety.

Touch screen 112 may have a video resolution in excess of 100 dpi. In some examples, the touch screen has a video resolution of 160 dpi. The user may make contact with touch screen 112 using any suitable object or appendage, such as a stylus, a finger, and so forth. In some examples, the user interface is designed to work primarily with finger-based contacts and gestures, which can be less precise than stylus-based input due to the larger area of contact of a finger on the touch screen. In some examples, the device translates the rough finger-based input into a precise pointer/cursor position or command for performing the actions desired by the user.

In some examples, in addition to the touch screen, device 100 may include a touchpad (not shown) for activating or deactivating particular functions. In some examples, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 6 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some examples, an optical sensor is located on the back of device 100, opposite touch screen display 112 on the front of the device so that the touch screen display may be used as a viewfinder for still and/or video image acquisition. In some examples, an optical sensor is located on the front of the device so that the user's image may be obtained for video conferencing while the user views the other video conference participants on the touch screen display. In some examples, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 6 shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some examples, at least one contact intensity sensor is collocated with, or proximate to, a touch-sensitive surface (e.g., touch-sensitive display system 112). In some examples, at least one contact intensity sensor is located on the back of device 100, opposite touch screen display 112, which is located on the front of device 100.

Device 100 may also include one or more proximity sensors 166. FIG. 6 shows proximity sensor 166 coupled to peripherals interface 118. Alternately, proximity sensor 166 may be coupled to input controller 160 in I/O subsystem 106. Proximity sensor 166 may perform as described in U.S. Patent Application Pub. Nos. 2006/0161871, "Proximity Detector In Handheld Device"; 2006/0161870, "Proximity Detector In Handheld Device"; 2008/0167834, "Using Ambient Light Sensor To Augment Proximity Sensor Output"; 2007/0075965, "Automated Response To And Sensing Of User Activity In Portable Devices"; and 2008/0140868, "Methods And Systems For Automatic Configuration Of Peripherals," which are hereby incorporated by reference in their entirety. In some examples, the proximity sensor turns off and disables touch screen 112 when the multifunction device is placed near the user's ear (e.g., when the user is making a phone call).

Device 100 optionally also includes one or more tactile output generators 167. FIG. 6 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some examples, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some examples, at least one tactile output generator sensor is located on the back of device 100, opposite touch screen display 112, which is located on the front of device 100.

Device 100 may also include one or more accelerometers 168. FIG. 6 shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some examples, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some examples, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some examples, memory 102 stores device/global internal state 157. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some examples, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some examples, contact/motion module 130 and display controller 156 detect contact on a touchpad.

In some examples, contact/motion module 130 uses a set of one or more intensity thresholds to determine whether an operation has been performed by a user (e.g., to determine whether a user has "clicked" on an icon). In some examples, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some examples, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some examples, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some examples, a widget includes an HTML (Hypertext Markup Language) file, a CSS (Cascading Style Sheets) file, and a JavaScript file. In some examples, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some examples, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some examples, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. Patent Application Pub. No. 2008/0320391, "Portable Multifunction Device, Method, and Graphical User Interface for Playing Online Videos," published Dec. 25, 2008, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various examples. For example, video player module may be combined with music player module into a single module (e.g., video and music player module 152). In some examples, memory 102 may store a subset of the modules and data structures identified above. Furthermore, memory 102 may store additional modules and data structures not described above.

In some examples, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some examples, the touchpad, when touched by the user, navigates device 100 to a main, home, or root menu from any user interface that is displayed on device 100. In such examples, a "menu button" is implemented using a touchpad. In some other examples, the menu button is a physical push button or other physical input control device instead of a touchpad.

In some examples, an electronic device is disclosed. The electronic device may include: one or more light sources; a plurality of sensors; an optical encoder; an integrated module comprising a first body, wherein the light sources, the plurality of sensors, and the optical encoder are each coupled to the first body such that the light sources, the plurality of sensors, and the optical encoder are maintained in optical alignment; and a shaft coupled to the optical encoder, wherein the shaft is disposed outside the integrated module. Alternatively or in addition to one or more examples of the disclosure, the shaft is flexibly coupled to the optical encoder such that the shaft is able to tilt without causing the optical encoder to tilt and move out of optical alignment with the light sources and the plurality of sensors. Alternatively or in addition to one or more examples of the disclosure, the electronic device may further include: one or more buttons disposed around the shaft and configured to be depressed by the shaft when the shaft is tilted. Alternatively or in addition to one or more examples of the disclosure, the optical encoder may include an optical target on a surface of the optical encoder, the optical target comprising a pattern of high-reflective and low-reflective regions. Alternatively or in addition to one or more examples of the disclosure, the electronic device may further include: one or more O-rings that couple the optical encoder to the first body of the integrated module, wherein the O-rings are configured to allow the optical encoder to rotate but prevent the optical encoder from tilting with respect to the axis of rotation. Alternatively or in addition to one or more examples of the disclosure, the one or more O-rings may be further configured to seal the integrated module with the light sources, the plurality of sensors, and a portion of the optical encoder are enclosed within the integrated module. Alternatively or in addition to one or more examples of the disclosure, the portion of the optical encoder enclosed within the integrated module may comprise a pattern of high-reflective and low-reflective regions. Alternatively or in addition to one or more examples of the disclosure, coupling the optical encoder and one of the plurality of sensors to the first body of the integrated module may maintain optical alignment of the optical encoder and the one of the plurality of sensors within a predetermined tolerance. Alternatively or in addition to one or more examples of the disclosure, the first body of the integrated module may include one or more components that electrically connect the plurality of sensors and the light sources to the electronic device. Alternatively or in addition to one or more examples of the disclosure, the electronic device may further include: circuitry of one or more of the plurality of sensors and the light sources, wherein the circuitry is enclosed within the integrated module.

In some examples, a method of manufacturing an electronic device is disclosed. The method may include: coupling one or more light sources, a plurality of sensors, and an optical encoder to a first body of an integrated module, wherein the integrated module encloses the light sources, the plurality of sensors, and at least a portion of the optical encoder; sealing the integrated module using one or more O-rings that couple the optical encoder to the first body of the integrated module; and after sealing the integrate module, coupling the optical encoder to a shaft, wherein the shaft is disposed outside the integrated module. Alternatively or in addition to one or more examples of the disclosure, the method may further include: before sealing the integrated module, aligning the optical encoder and one of the plurality of sensors within a predetermined tolerance; wherein coupling the optical encoder and the one of the plurality of sensors to the first body of the integrated module maintains optical alignment of the optical encoder and the one of the plurality of sensors within the predetermined tolerance. Alternatively or in addition to one or more examples of the disclosure, the shaft may be flexibly coupled to the optical encoder such that the shaft is able to tilt without causing the optical encoder to tilt and move out of optical alignment with the light sources and the plurality of sensors. Alternatively or in addition to one or more examples of the disclosure, the method may further include: disposing one or more buttons around the shaft and configured to be depressed by the shaft when the shaft is tilted. Alternatively or in addition to one or more examples of the disclosure, the method may further include: depositing an optical target on a surface of the optical encoder, the optical target comprising a pattern of high-reflective and low-reflective regions. Alternatively or in addition to one or more examples of the disclosure, the O-rings may be configured to allow the optical encoder to rotate but prevent the optical encoder from tilting with respect to the axis of rotation. Alternatively or in addition to one or more examples of the disclosure, the portion of the optical encoder enclosed within the integrated module may comprise a pattern of high-reflective and low-reflective regions. Alternatively or in addition to one or more examples of the disclosure, the method may further include: electrically connecting the plurality of sensors and the light sources to the electronic device through one or more components of the first body. Alternatively or in addition to one or more examples of the disclosure, the integrated module may further enclose circuitry of one or more of the plurality of sensors and the light sources.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device comprising:
   one or more light sources;
   a plurality of sensors;
   an optical encoder;
   an integrated module comprising a first body, wherein the light sources, the plurality of sensors, and the optical encoder are each coupled to the first body such that the light sources, the plurality of sensors, and the optical encoder are maintained in optical alignment; and
   a shaft coupled to the optical encoder, wherein the shaft is disposed outside the integrated module and flexibly coupled to the optical encoder such that the shaft is able to tilt without causing the optical encoder to move out of optical alignment with the light sources and the plurality of sensors; and
   one or more buttons disposed around the shaft and configured to be depressed by the shaft when the shaft is tilted.

2. The electronic device of claim 1, wherein the optical encoder includes an optical target on a surface of the optical encoder, the optical target comprising a pattern of high-reflective and low-reflective regions.

3. The electronic device of claim 1, the electronic device further comprising:
   one or more O-rings that couple the optical encoder to the first body of the integrated module, wherein the O-rings are configured to allow the optical encoder to rotate but prevent the optical encoder from tilting with respect to an axis of rotation.

4. The electronic device of claim 3, wherein the one or more O-rings are further configured to seal the integrated module with the light sources, the plurality of sensors, and a portion of the optical encoder are enclosed within the integrated module.

5. The electronic device of claim 4, wherein the portion of the optical encoder enclosed within the integrated module comprises a pattern of high-reflective and low-reflective regions.

6. The electronic device of claim 1, wherein coupling the optical encoder and one of the plurality of sensors to the first body of the integrated module maintains optical alignment of the optical encoder and the one of the plurality of sensors within a predetermined tolerance.

7. The electronic device of claim 1, wherein the first body of the integrated module includes one or more components that electrically connect the plurality of sensors and the light sources to the electronic device.

8. The electronic device of claim 1, the electronic device further comprising:
   circuitry of one or more of the plurality of sensors and the light sources, wherein the circuitry is enclosed within the integrated module.

9. A method of manufacturing an electronic device, the method comprising:
   coupling one or more light sources, a plurality of sensors, and an optical encoder to a first body of an integrated module, wherein the integrated module encloses the light sources, the plurality of sensors, and at least a portion of the optical encoder;

sealing the integrated module using one or more O-rings that couple the optical encoder to the first body of the integrated module; and after sealing the integrated module, coupling the optical encoder to a shaft, wherein the shaft is disposed outside the integrated module, and disposing one or more buttons around the shaft and configured to be depressed by the shaft when the shaft is tilted, wherein the shaft is flexibly coupled to the optical encoder such that the shaft is able to tilt without causing the optical encoder to move out of optical alignment with the light sources and the plurality of sensors.

10. The method of claim 9, the method further comprising:

before sealing the integrated module, aligning the optical encoder and one of the plurality of sensors within a predetermined tolerance;

wherein coupling the optical encoder and the one of the plurality of sensors to the first body of the integrated module maintains optical alignment of the optical encoder and the one of the plurality of sensors within the predetermined tolerance.

11. The method of claim 9, the method further comprising:

depositing an optical target on a surface of the optical encoder, the optical target comprising a pattern of high-reflective and low-reflective regions.

12. The method of claim 9, wherein the O-rings are configured to allow the optical encoder to rotate but prevent the optical encoder from tilting with respect to an axis of rotation.

13. The method of claim 9, wherein the portion of the optical encoder enclosed within the integrated module comprises a pattern of high-reflective and low-reflective regions.

14. The method of claim 9, the method further comprising:

electrically connecting the plurality of sensors and the light sources to the electronic device through one or more components of the first body.

15. The method of claim 9, wherein the integrated module further encloses circuitry of one or more of the plurality of sensors and the light sources.

* * * * *

UNITED STATES PATENT AND TRADEMARK OFFICE
CERTIFICATE OF CORRECTION

PATENT NO.        : 9,983,029 B2
APPLICATION NO.   : 14/870301
DATED             : May 29, 2018
INVENTOR(S)       : Anant Rai Page 1 of 1

It is certified that error appears in the above-identified patent and that said Letters Patent is hereby corrected as shown below:

On the Title Page

Item [54], delete "TILT ABLE" and replace with --TILTABLE--.

Signed and Sealed this
Eleventh Day of September, 2018

Andrei Iancu
*Director of the United States Patent and Trademark Office*